United States Patent [19]
Robertson

[11] Patent Number: 5,359,445
[45] Date of Patent: Oct. 25, 1994

[54] FIBER OPTIC SENSOR

[75] Inventor: Robert M. Robertson, Valencia, Calif.

[73] Assignee: AlliedSignal Inc., Morris Township, N.J.

[21] Appl. No.: 114,963

[22] Filed: Oct. 30, 1987

[51] Int. Cl.⁵ .............................................. G01D 5/32
[52] U.S. Cl. ................................ 359/151; 250/227.14; 250/237 R; 73/702; 73/715; 73/655
[58] Field of Search ............... 350/96.10, 96.15, 96.20, 350/96.29, 96.30; 73/655, 657, 515, 702, 705, 715; 250/227, 231 P, 237 R, 237 G

[56] References Cited
U.S. PATENT DOCUMENTS

| | | | |
|---|---|---|---|
| 3,273,447 | 9/1966 | Frank | 73/655 |
| 3,580,082 | 5/1971 | Strack | 73/655 |
| 4,071,753 | 1/1978 | Fulenwider et al. | 250/227 |
| 4,307,937 | 12/1981 | Gordon | 350/96.29 |
| 4,403,144 | 9/1983 | Strahan et al. | 250/237 G |
| 4,600,836 | 7/1986 | Berthold, III et al. | 250/231 P |
| 4,668,093 | 5/1987 | Cahill | 250/227 X |
| 4,670,649 | 6/1987 | Senior et al. | 250/227 |
| 4,687,927 | 8/1987 | Iwamoto et al. | 250/231 P |

*Primary Examiner*—Mark Hellner
*Attorney, Agent, or Firm*—Robert A. Walsh

[57] ABSTRACT

A fiber optic sensor includes a generally cylindrical housing including a fiber optic transmitter in one end connected to a source of light, a sensor within the housing attached to the cylindrical wall of the housing exposed to the transmitted light and responsive to a sensed condition such as acoustic pressure waves to modulate the light, and a fiber optic receiver for receiving the modulated light and supplying it to an external circuit. The sensor may be a thin film fastened to the wall or it may include a diffraction pattern on a reflective inside surface of the wall which will produce a modulated light output with movement of the wall. The thin film may be fastened to the wall directly or suspended by means of Euler struts. The thin film may include a reflective spot and/or a moiré pattern for modulating the light. Another embodiment includes a resiliently mounted mass fastened to a thin film which may have quadrature or other patterns which would alter the light modulation pattern depending upon the direction of a sensed acceleration.

17 Claims, 3 Drawing Sheets

FIBER OPTIC SENSOR

This invention relates to fiber optic sensors and more particularly to a type of sensor in which a disturbing force representing values of a variable condition is used to cause a variation in the light transmission or reflection between a fiber optic transmitter and a fiber optic receiver.

There are in existence types of fiber optic sensors in which the disturbing influence alters the transmissibility or refraction or reflection of a specific substance. Such sensors tend to be large, cumbersome and/or subject to errors induced by other influences than the one being studied. Applicant has become aware of a need in the area of underwater sensing of sound signals and the transmission of such signals. The usual piezoelectric hydrophones although they individually can be made quite small, become quite heavy and require a considerable number of wires to transmit the desired information when used in a large array. As is well understood in the art, multiplexing techniques will permit the transmission of a greater number of discrete signals through fiber optics than through conventional wires.

Applicant has devised an acoustic sensor incorporating fiber optics into a generally cylindrical housing which contracts and expands with changes in a sensed condition. These changes are then transmitted to a thin film member fastened to the housing which responds to the physical changes by modulating the light path between a fiber optic transmitter and a fiber optic receiver. Alternatively, the light may be directed on the wall itself which has a pattern of reflective and non-reflective areas which, as the wall moves, is effective to modulate the incident light so that the fiber optic receiver receives light modulated as a function of the disturbing force. Further work has indicated that such a sensor may also serve as a transducer to modulate an optical signal with changes in other pressures, temperature, and, where a resiliently suspended mass is attached to the film, with acceleration. Additional embodiments utilize a cylindrical housing wherein the compliant cylindrical wall is of piezoelectric material, either ceramic such as barium titanate or a piezoelectric plastic material such as PVDF (polyvinylidenefluoride). The cylindrical wall is polarized radially so that when exposed to acoustic waves, a voltage is generated between the inside and outside surfaces. This voltage is connected to opposite sides of a liquid crystal polymer film fastened to the inside wall which voltage operates to change the molecular alignment in the film to vary its light transmission and thereby modulate the light transmitted between an optical transmitter and receiver.

Figure 1:
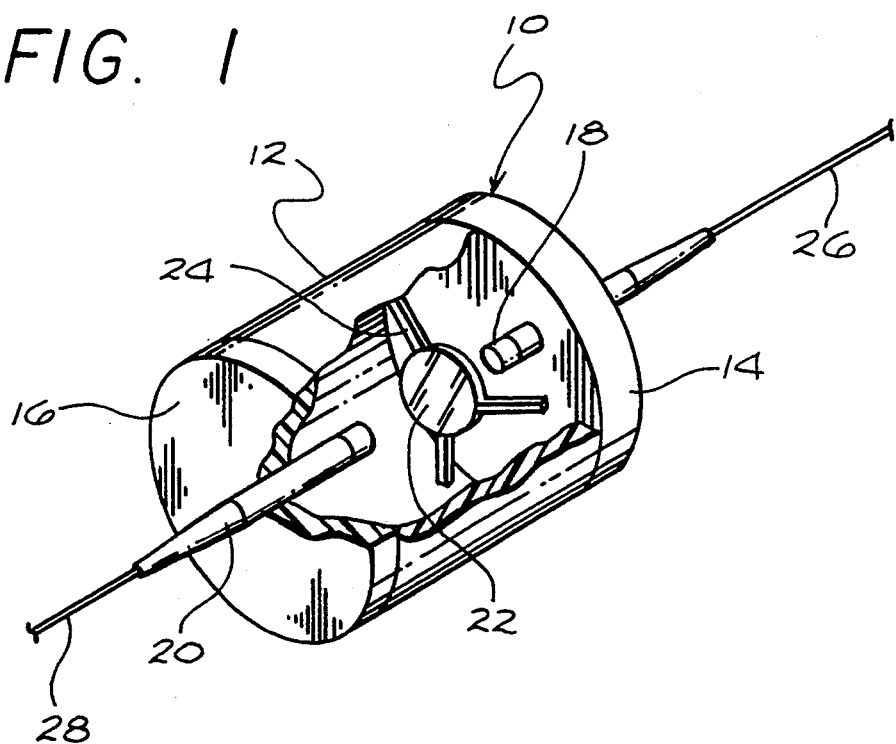
FIG. 1 is a perspective view, partly in section, of a fiber optic sensor according to my invention.

Referring now to FIG. 1, an embodiment of my fiber optic sensor is shown in a perspective drawing, partly in section, wherein a cylindrical housing is generally shown at numeral 10, which incorporates a cylindrical wall 12 and endcaps 14 and 16 sealed to wall 12. In each of the end caps are sealed optical units, an optical transmitter 18 being carried in endcap 14 and an optical receiver 20 being sealed in endcaps 16. A thin film member 22 is physically position along the axis of the cylindrical housing directly between the transmitter 18 and the receiver 20 which thin film is pretensioned directly to the interior cylinder wall or is suspended between Euler struts or columns 24 which are pretensioned to the cylinder wall. Light transmitter 18 and light receiver 20 are connected to fiber optic leads 26 and 28, respectively.

Light is supplied through lead 26 to the optical transmitter 18 such that it is directed on and through the thin film member 22 and is collected on optical receiver 20. The received modulated light information is passed to an external circuit through fiber optic lead 28.

In operation, the pressure wave, which might be an acoustic pressure wave generated from an external source, is transmitted by the medium in which the device is placed to the cylindrical wall 12. This wall responds to the pressure wave by contraction and expansion along a preferred axis, which in the present embodiment is in a radial mode. The oscillations of the cylinder 12 are transmitted by direct coupling to the thin optical film 22 which oscillates with the cylinder 12. Where coupling is accomplished by the Euler struts 24 an amplification may be initiated depending on the relationship of the polar inertia of the strut that can either oscillate the suspended film about the axis of the projected light or along the axis of the projected light. By careful selection of the dimensions of the Euler struts or columns and the inertia of the thin film 22, the system may also be tuned as a filter such as a low-pass filter. The thin film 22 will, under strain, alter or reflect light that strikes it. The thin film may include a moiré pattern or grid which can be engraved or photographically applied, or applied by means of chemical etches. Other ways in which the thin film 22 may alter the light would include change of molecular orientations, polarization or reflective depositions placed on the film 22. With a moiré grid pattern on the film, light from the optical transmitter is modulated by movement of this moiré grid and as modulated is collected by the optical receiver 20. The modulation patterns are distorted by strains in the thin film 22 and the measure of this distortion is related to the applied strain.

Figure 2:
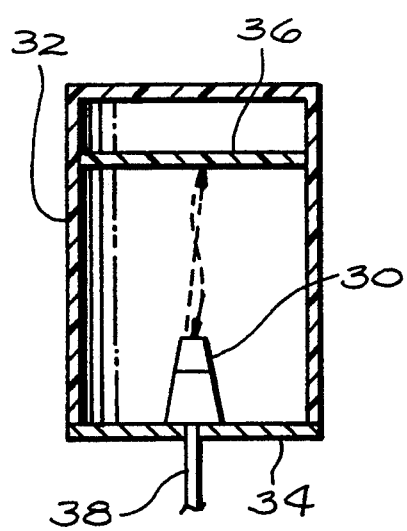
FIG. 2 is a schematic drawing of another embodiment of my invention.
Figure 3:
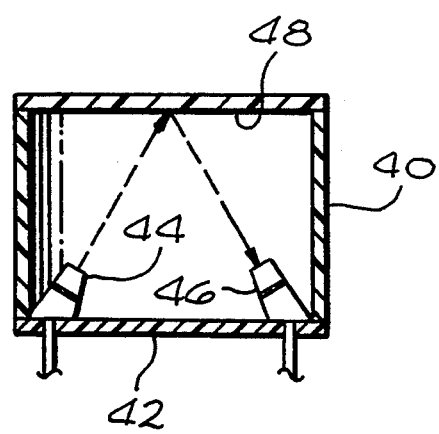
FIG. 3 is a schematic drawing of another embodiment of my invention.

Another embodiment of my invention is shown schematically in FIG. 2 wherein an optical receiver transmitter 30 is located in a cylindrical housing 32 to which is sealed an endcap 34 carrying the transmitter receiver 30. A thin film 36 is securely fastened to the inside wall of the housing 32 and vibrates or moves radially in response to the disturbance caused by changes external conditions such as acoustic pressure. In this instance the moiré grid is on a reflective film that reflects back to the optical transmitter/receiver to carry a modulated signal back up the same optical lead 38 which carries the transmitted signal. Where is it not desired to incorporate the transmitter and receiver in a single unit and the film is arranged to supply a reflected modulation signal, the sensor is made as shown in FIG. 3 wherein the cylindrical wall 40 is attached to an endcap 42 containing a transmitter 44 and a receiver 46. A thin film 48, having a reflecting pattern, is sealed to the inside wall of the cylindrical housing 40 and the light transmitted from transmitter 44 is transmitted at an angle and reflected at a suitable angle to the receiving optical unit 46. As the wall 40 vibrates in a radial mode, this will cause the light from transmitter 44 to be modulated by the moiré pattern on thin film 42 as it is reflected back to receiver 46.

Figure 4:
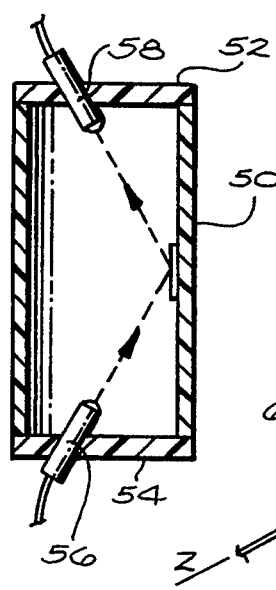
FIG. 4 is a schematic drawing of still another embodiment of my invention.

A somewhat different enbodiment of my invention is shown in FIG. 4 wherein the cylindrical housing 50 is sealed to endcaps 52 and 54, each of which carries an optical unit, endcap 54 holding the optical transmitter 56 and endcap 52, the optical receiver 58. It will be observed that these optical units are at an angle such that the light from the transmitter 56 impinges on the wall 50 and is reflected to the optical receiver 58. A grid or desired pattern is deposited on a polished portion of the inner diameter of the cylinder 50 and as the cylinder vibrates in a radial mode the pattern of light reflected to the receiver 58 is modified in response to this vibration.

Figure 5:
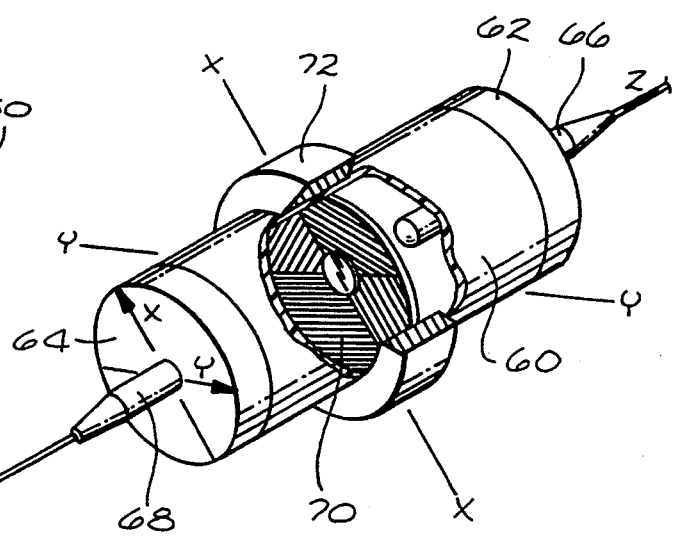
FIG. 5 is a perspective view of an embodiment of my invention useful for sensing acceleration.
Figure 6:
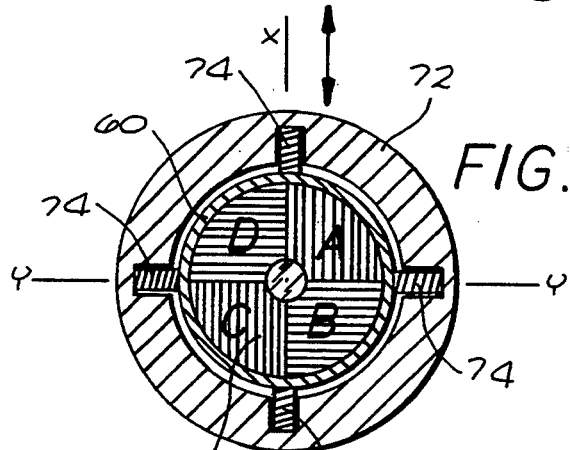
FIG. 6 is a sectional view taken along the X-Y axis defined in FIG. 5.

FIG. 5 is a perspective of an embodiment of my invention useful for sensing acceleration and includes a generally cylindrical wall 60 sealed to endcaps 62 and 64, endcap 62 carrying an optical transmitter 66 and endcap 64, an optical receiver 68, essentially as described above. In this embodiment a thin optical film member 70 sealed to wall 60 has applied to it a quadrature pattern surrounding a small reflective central spot. It will be noted that in this perspective view the film is located in the X-Y plane and is directly perpendicular to the axis of the sensor which is in the Z plane. An inertial mass 72 is effectively connected to the wall 60. FIG. 6 is a plan view showing the film 70, the mass 72, and the compliant cylinder wall 60 to which the film 70 is attached. The film 70 is suspended from the cylinder by means of a plurality of springs 74 arranged along the X and Y axes.

In operation the film will respond with the compliant cylinder as loads are applied to the cylinder by the inertial mass 72. While the film may be imprinted or otherwise have attached a number of patterns, Applicant has shown herein a quadrature pattern with the quarters designated as A, B, C and D. With an acceleration force along the X axis, the mass 72 deforms the cylinder which, in turn, deforms the film along the X axis. The patterns D and B compress and expand while patterns A and C elongate and shrink. Thus sections D and B would pass a given light source that would be easily detectable while the light through the grids on quadrants A and C would be minimally disturbed. The grid pattern changes affect the received light in a manner related to the original disturbing force. If the acceleration were along the Y axis, grids in quadrants A and C would show much larger pattern changes than those of quadrants B and D and the received light pattern would reflect this acceleration.

Should the acceleration be at any angle on the X-Y plane, the pattern in each quadrant would be directly co-related to the angle of inclination to the X-Y axes and would be a measure of the disturbing force. In the case of an acceleration at 45 degrees to either the X or Y axes, all four quadrants would show identical pattern changes. For an acceleration of 25 degrees from the X axis quadrants B and D would have a higher pattern change than the change of quadrants A and C.

Figure 7:
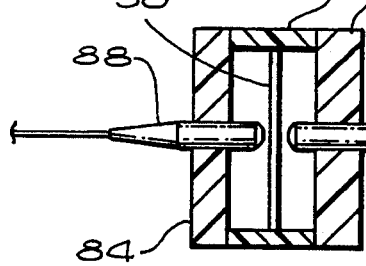
FIG. 7 is a schematic side view of a modification of the embodiment of FIG. 5 and 6.

FIG. 7 is a schematic side view of a modification of the embodiment of FIG. 5 and 6 to permit the sensor to sense acceleration along the Z axis. In this instance mass 72 is suspended along the Z axis by means of contact springs 76 and the optical film 70 is located along wall 60 at a discrete distance from the transmitter/receiver 78. The endcaps are rigidly attached to a stationary foundation. Under acceleration loads along the Z axis, the mass 72 deforms the compliant cylinder 60 along the same axis and, since the optical film 70 is attached to the cylinder 72, the film is also displaced along the Z axis. In this manner, the discrete distance between the film and optical tranmitter/receiver 78 is varied in proportion to the acceleration force along the Z axis. Since the center of the film 70 contains a reflective spot, the intensity of the light or the phase change of the reflected light received at the optical transmitter/receiver is a measure of this acceleration force.

Figure 8:
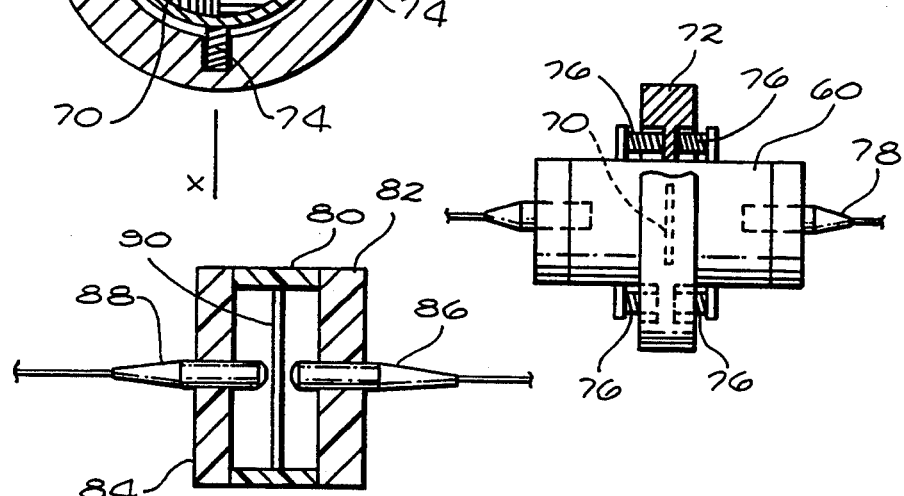
FIG. 8 is a section view of a temperature responsive embodiment of my invention.

As stated above, my sensor is also applicable to the sensing of ambient temperature. Such a sensor is shown in FIG. 8 which includes a cylindrical body 80, having sealed to it endcaps 82 and 84 which carry an optical transmitter 86 and an optical receiver 88, respectively. Sealed to the inside wall of cylindrical housing 80 between the transmitter 86 and the receiver 88 is an optical thin film member 90. The cylinder 80 is of material having good thermal conductivity and thermal expansion properties and is preferably of thin wall and short cylinder length to insure maximum radial deformation. With such structure the thermal body will have a quick response to temperature fluctuations. Radial expansion of the wall 80 causes a stretching and displacement of portions of the thin film thereby modulating or changing the light received at the receiver 88 which modulated signal then varies as a function of the sensed temperature.

Figure 9:
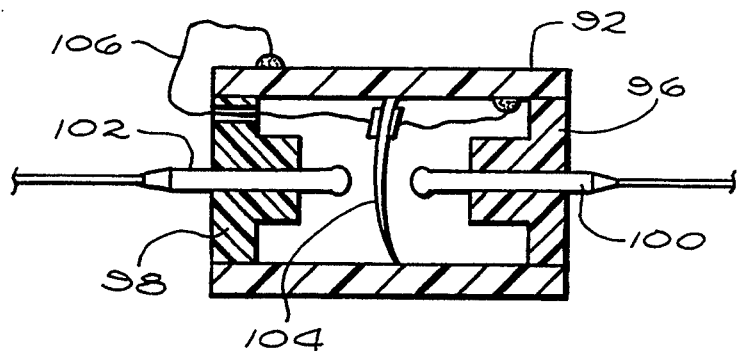
FIG. 9 is a sectional view of an embodiment of my invention wherein a piezoelectric voltage is employed to modify the transmissibility of a liquid crystal polymer film.

FIG. 9 is a sectional view of an embodiment of my invention wherein a piezoelectric voltage is employed to modify the transmissability of a liquid crystal polymer film. In this embodiment a cylindrical housing 92 of piezoelectric ceramic material such as barium titanate is sealed to endcaps 94 and 96 which support along the axis of the cylindrical housing, a laser diode light transmitting device 100 and an optical receiver 102, respectively. Fastened to the inside wall of the piezoelectric cylindrical housing is a liquid crystal polymer film 104. Since the cylindrical housing member 92 is of piezoelectric material and is polarized radially, any disturbance in the form of acoustic waves impinging upon this housing will result in the generation of a voltage between the outer and inner walls of member 92. The voltage level on the outside wall is connected by means of a wire 106 to an electrode on one side of the liquid crystal polymer film and the voltage on the inside wall is connected to a similar electrode on the opposite side of the film 104. As a result, the film 104 has impressed upon it essentially the same voltage as that which is generated in the piezoelectric ceramic housing member. Since, in the liquid crystal film the molecules are aligned in preset directions, they can then be deflected from their orientation or molecular alignment by the application of this voltage differential. The light from the laser transmitter which is focused on the film and collected by the receiver 102 is then modulated by the deflection within the film resulting from the voltage generated in the piezoelectric ceramic member 92. The ceramic member 92 could also be replaced by a PVDF compliant cylinder which would generate a voltage to be applied to the liquid crystal polymer film in essentially the same manner. The embodiment thus described has a considerable advantage in that the electrical conductors required are only the very simple short leads shown and the acoustic signal is carried by means of the fiber optics. Since it is normally necessary to include a large number of such sensors in a towed array, for example, this simplification in electrical wiring is of great benefit.

Figure 10:
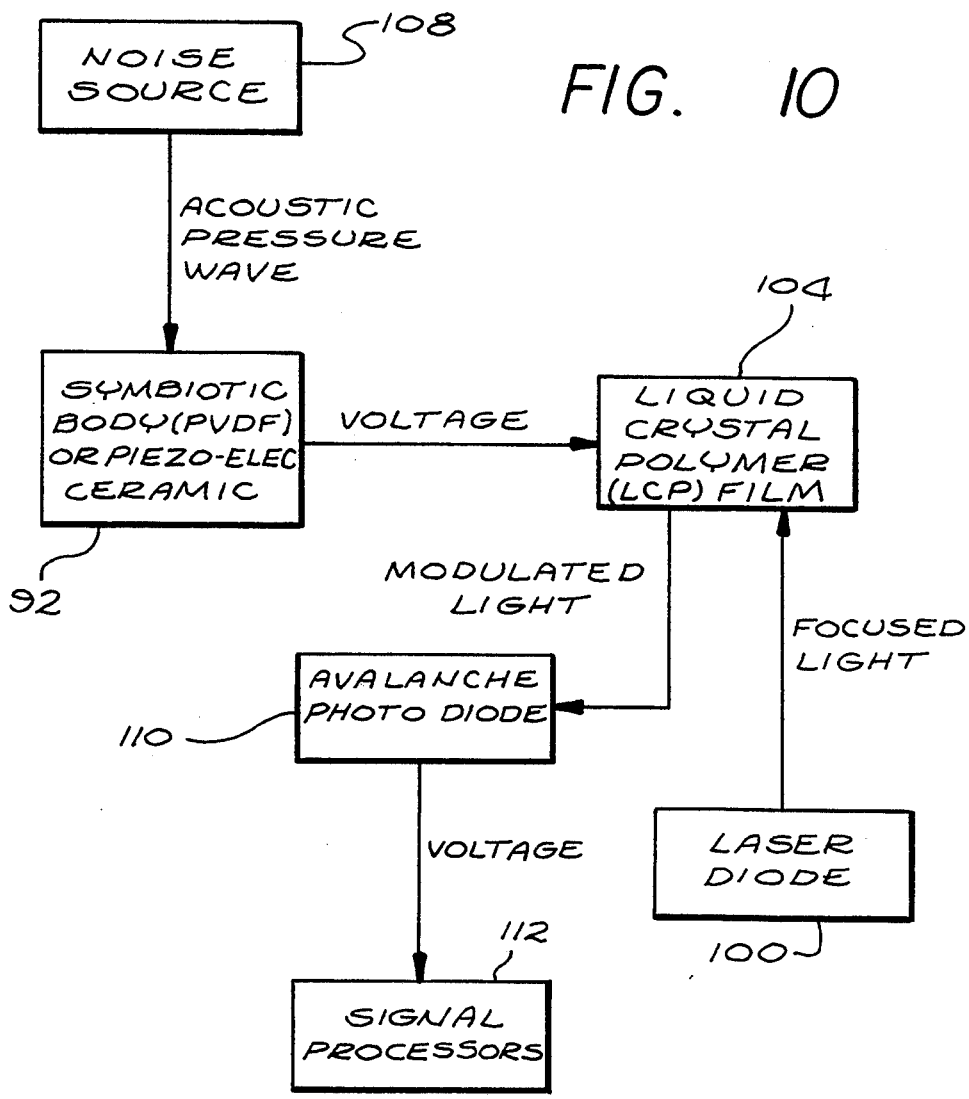
FIG. 10 is a block diagram of a system in which the sensor of FIG. 9 would typically be utilized.

FIG. 10 is a system block diagram showing the manner in which a sensor such as that of FIG. 9 might be incorporated into a sonar system. In this system a noise source, which could be a reflected acoustic signal from underground geologic strata, is shown at numeral 108 and this source generates acoustic pressure waves which impinge upon the piezoelectric housing 92. As a result of the varying voltage output of the piezoelectric body 92 the liquid crystal polymer film 104 incurs a molecular reorientation which varies the transmissivity of the light from the laser diode 100. This variation in transmissivity is translated as modulated light to an avalanche photo diode 110 which converts this modulated light signal to a variable voltage signal which is supplied to one or more signal processors 112.

In addition to the embodiments discussed above, similar sensing devices may be produced by other loads and strains induced by various means which can cause deformation of the housing to vary the light received. Also, as will be recognized by those skilled in the art, many kinds of patterns can be deposited, molded or otherwise formed onto the thin films which are effective to modulate the light and thereby provide an effective optical output.

I claim:

1. A fiber optical sensor including a housing having a wall adapted to be exposed to a variable condition to be sensed, a source of light, a fiber optic transmitter connected to receive light from said source and connected to emit light within said housing, a thin film in said housing operatively connected to said wall positioned to receive light from said transmitter and capable of modulating said light with movement of said wall in response to changes in said variable condition, and optical receiver means in said housing responsive to the modulated light from said thin film.

2. A fiber optic sensor as claimed in claim 1 wherein said light modulating means is a thin film having a moire grid pattern.

3. A fiber optic sensor as claimed in claim 1 wherein said light modulating means is a reflective surface on said wall, a non-reflective pattern is formed on said surface, the light transmitted by said fiber optic transmitter is incident to said surface and said optical receiver is coincident to said surface.

4. A fiber optic sensor as claimed in claim 1 wherein said variable condition is acoustic pressure acting against and distorting said wall.

5. A fiber optic sensor as claimed in claim 1 wherein said variable condition is ambient temperature.

6. A fiber optic sensor as claimed in claim 1 wherein said wall incorporates an acceleration compliant member and a mass, and said thin film is operatively connected to said mass such that said thin film modulates said transmitted light in response to acceleration.

7. A fiber optic sensor as claimed in claim 6 wherein said mass is resiliently suspended in a plane perpendicular to the direction of said transmitted light, said thin film including a pattern whose modulation of transmitted light varies with the angle of acceleration in said plane.

8. A fiber optic sensor as claimed in claim 7 wherein said mass is further resiliently suspended parallel to the direction of said transmitted light, said thin film includes a reflective spot at a defined distance from said light receiving means such that acceleration of said mass parallel to said transmitted light varies said distance and the intensity of the reflected light with said acceleration.

9. A fiber optic sensor including a housing having a wall adapted to be exposed to a variable condition to be sensed, a source of light, a fiber optic transmitter connected to receive light from said source and connected to said housing to emit light within said housing, a thin film including a reflective surface and a non-reflective pattern in said housing capable of modulating light positioned to receive light from said transmitter, means operatively connecting said thin film to said wall to modulate the light transmitted with changes in said variable conditions, optical receiver means in said housing responsive to the modulated light from said thin film, the light transmitted by said fiber optic transmitter being incident to said surface and said optical receiver means receiving light coincident to said surface.

10. A fiber optic sensor as claimed in claim 9 wherein said variable condition is acoustic pressure acting against and distorting said wall.

11. A fiber optic sensor as claimed in claim 9 wherein said variable condition is ambient temperature.

12. A fiber optic sensor including a housing of generally cylindrical configuration including a cylindrical wall exposed to a variable condition, a fiber optic transmitter connected to a source of light positioned in one end of said housing, a thin film member in said housing exposed to light from said transmitter, means including a plurality of Euler columns pretensioned to said wall operatively connecting said thin film member to said wall to modulate the light received from said transmitter with changes in said variable condition, and optical receiver means in said housing responsive to the modulated light from said thin film member.

13. A fiber optic sensor as claimed in claim 12 wherein said thin film includes a moiré grid pattern.

14. A fiber optic sensor as claimed in claim 13 wherein said variable condition is acoustic pressure.

15. A fiber optic sensor as claimed in claim 13 wherein said variable condition is ambient temperature.

16. A fiber optic sensor as claimed in claim 12 wherein the dimensions of said Euler columns and the thin film are selected such that said sensor operates to discriminate against specific frequencies.

17. A fiber optic sensor as claimed in claim 1 wherein said wall is of piezoelectric material, said condition is acoustic pressure, and said thin film is a liquid crystal polymer film connected to receive a voltage generated from said piezoelectric material in response to changes in acoustic pressure sensed by said wall.

* * * * *